United States Patent [19]
Criniti et al.

[11] Patent Number: 6,094,330
[45] Date of Patent: *Jul. 25, 2000

[54] CIRCUIT INTERRUPTER HAVING IMPROVED CURRENT SENSING APPARATUS

[75] Inventors: Joseph Criniti, New Britain; Edward E. Kim, Burlington; Javier I. Larranaga, Bristol; Esteban Santos, Farmington, all of Conn.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/006,794

[22] Filed: Jan. 14, 1998

[51] Int. Cl.⁷ ........................................................ H02H 3/00
[52] U.S. Cl. ........................... 361/93.1; 361/93.7; 361/102
[58] Field of Search ................................. 361/42, 47, 93, 361/78–79, 86–87, 115, 94–102, 93.1, 93.2, 93.3, 93.6, 93.7

[56] References Cited

U.S. PATENT DOCUMENTS

| | | | |
|---|---|---|---|
| 4,425,596 | 1/1984 | Satou | 361/93 |
| 4,532,571 | 7/1985 | Satou | 361/93 |
| 4,589,052 | 5/1986 | Dougherty | 361/94 |
| 4,672,501 | 6/1987 | Bilac et al. | 361/96 |
| 5,023,684 | 6/1991 | Tsunoda | 257/423 |
| 5,247,419 | 9/1993 | Grundmann | 361/94 |
| 5,583,732 | 12/1996 | Seymour | 361/93 |
| 5,615,075 | 3/1997 | Kim | 361/87 |

FOREIGN PATENT DOCUMENTS

| | | | |
|---|---|---|---|
| 2749664 | 12/1997 | France | G01R 19/00 |
| 1953678 | 3/1997 | Germany | H01H 47/22 |

OTHER PUBLICATIONS

Oct.–Nov. 1996 Electrotechnology The Attractions of giant magnetoresistance sensors Ted Tingay pp. 33–35.

International Search Report Apr. 26, 1999 Sandra Van der Meer.

*Primary Examiner*—Michael J. Sherry
*Attorney, Agent, or Firm*—Dave S. Christensen; Carl B. Horton

[57] ABSTRACT

A circuit interrupter of the type including an electronic trip unit for overcurrent determination which includes a small-sized iron core current transformer to power the trip unit electronics along with a giant magnetic resistor semiconductor (GMR) to sense the current flow within the protected circuit.

8 Claims, 2 Drawing Sheets ical trip unit circuit. The first function is to
provide operating power to the electronics within the trip
unit and the second function is to provide electronic signals
representative of the magnitude of the current flowing within
each phase of a multi-phase electrical distribution system.
U.S. Pat. No. 5,583,732 entitled "Modular Current Transformer for Electronic Circuit Interrupters" describes a recent approach to combine the two functions within a single modular arrangement.

Since the current sensing and power-up transformers are usually contained within the circuit breaker enclosure, along with the circuit breaker operating mechanism, contacts and trip unit, the space requirements are governed by the size of the transformers. When four and five pole circuit breakers are required as within European and Asian distribution circuits, the size of the circuit breakers are increased accordingly.

It would be beneficial to be able to provide a minimum size current transformer for power-up function while using small-sized electronic transducers for determining the current magnitude in view of cost and size restraints with multi-pole circuit breaker applications.

One purpose of the invention accordingly, is to provide a multi-pole circuit breaker having the smallest conceivable power-up transformers and current sensors.

SUMMARY OF THE INVENTION

A circuit interrupter of the type including an electronic trip unit for overcurrent determination includes a small-sized iron core current transformer to power the trip unit electronics along with a giant magnetic resistor semiconductor (GMR) to sense the current flow within the protected circuit. One GMR is used within each pole of a multipole electric circuit while one or more current transformers can be effectively employed for power-up function.

DESCRIPTION OF THE PREFERRED EMBODIMENT

Figure 1:
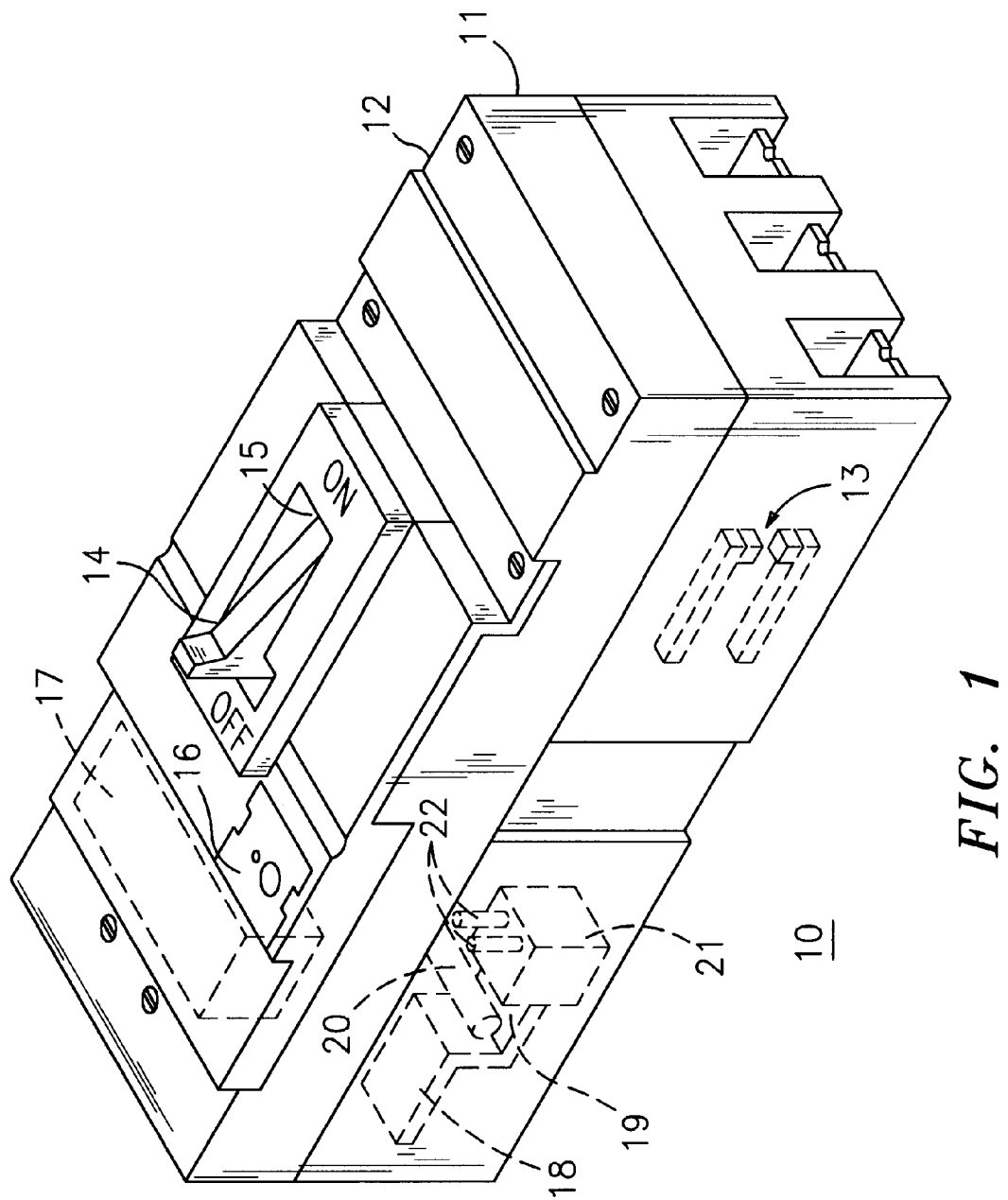
FIG. 1 is a front perspective view of a circuit breaker having the GMR semiconductor sensor in accordance with the invention.

An electronic circuit breaker 10 is shown in FIG. 1 to consist of a molded plastic case 11 to which a cover 12 of similar material is attached. A pair of separable contacts 13 are turned to ON and OFF positions by means of an external operating handle 14 that extends through an aperture 15 in the circuit breaker cover. A rating plug 16 is used to set the ampere rating of the digital trip unit 17 containing a microprocessor as described in the aforementioned U.S. Pat. No. 4,672,501. The operation of the trip unit 17 to interrupt circuit current upon occasion of an overcurrent condition within the protected circuit is described in U.S. Pat. No. 4,589,052 entitled "Digital 12T Pickup, Time Bands and Timing Control Circuits for Static Trip Circuit Breakers" In accordance with the invention, a GMR semiconductor 19 is positioned on the load strap 18 for sensing the current transfer through the line strap and transferring signal representations thereof to the trip unit 17 over a pair of conductors 20. The GMR is a type NVE AAxxx obtained from Nonvolatile Electronics Inc. and is similar to that described in U.S. Pat. No. 5,933,306 entitled: "Circuit Breaker With Ground Fault Detection Module" filed concurrently. An iron core miniature current transformer 21 is connected within one more phases within the transformer case 11 to provide operating power to the trip unit 17 over a pair separate conductors 22.

Figure 2:
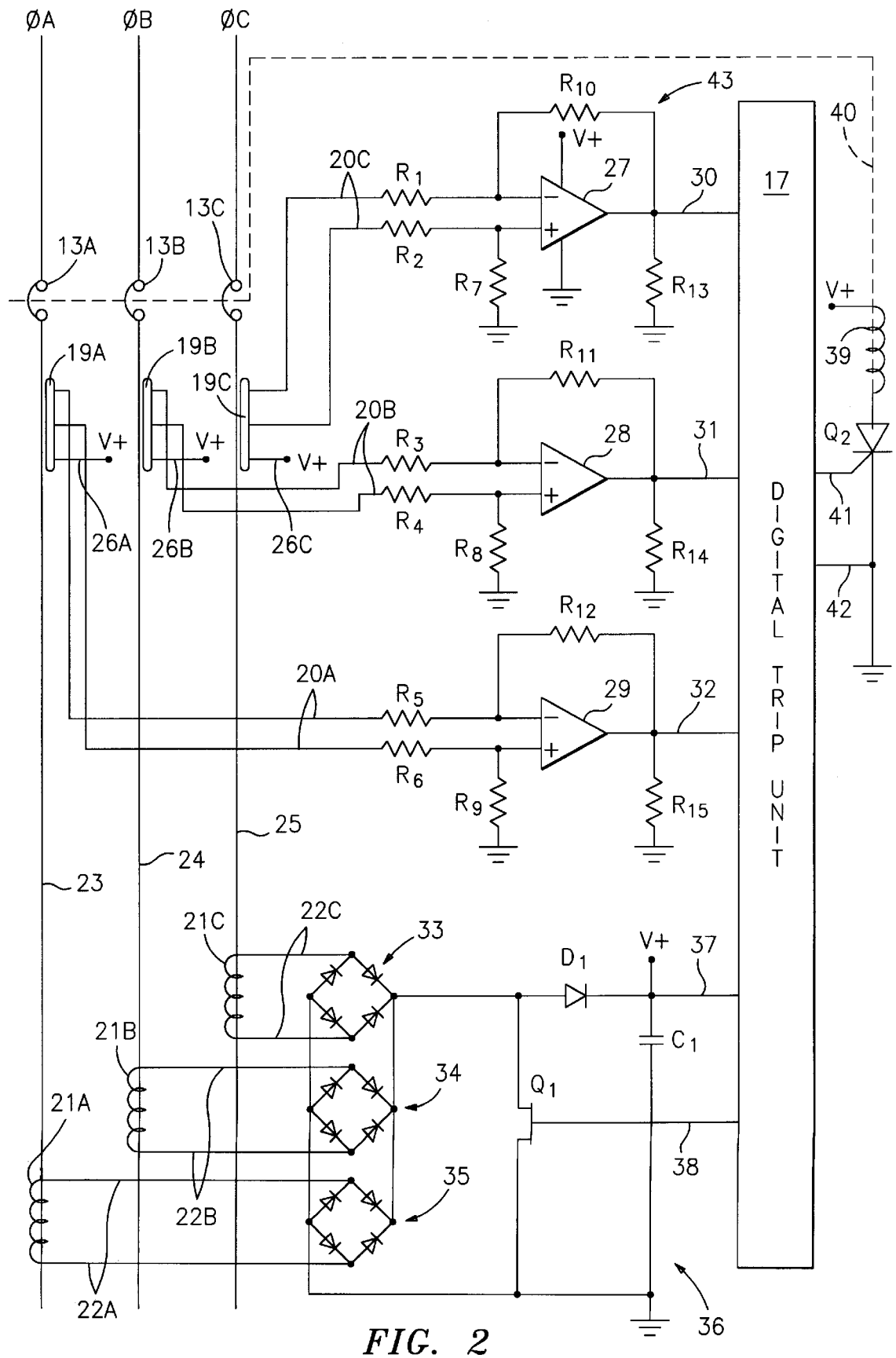
FIG. 2 is a diagrammatic representation of the electronic components within the circuit breaker of FIG. 1.

The electrical connections between the phase conductors 23–25 in an associated protected circuit and the circuit breaker trip unit 17 are now shown in FIG. 2. The circuit breaker contacts 13(A–C) are connected in series within the A–C phases represented by conductors 23–25, the GMR's 19(A–C) are positioned next to the conductors and the current transformers 21(A–C) are connected such that the conductors provide the primary windings to the respective current transformers. The output of the current transformers 21(A–C) connect through conductors 22(A–C) with the power input ports of the trip unit 17 via conductors 37, 38 through a shunt regulator circuit 36 consisting of the bridge rectifiers 33–35, diode rectifier D1, FET switch Q1, and filter capacitor C1 to provide operational power to the trip unit. The output of the GMR's 19(A–C) connect through conductors 20(A–C) with the logic input ports of the trip unit 17 via conductors 30–32 through the conditioner circuit 43 consisting of current limiting resistors R1–R6, reference resistors R7–R9, inverted operational amplifiers 27–29, feedback resistors R10–R12 and burden resistors R13–R15 respectively. Operating power to each of the GMR's 19(A–C) is provided by means of conductors 26(A–C).

The output ports of the trip unit 17 connect with ground over conductor 42 and with the gate of the switching transistor Q2 to energize the flux shifter unit 39 for separating the circuit breaker contacts 13(A–C) over conductor 41 and the control line 40 upon occurrence of an overcurrent condition within the protected circuit in the manner described within the aforementioned U.S. Pat. No. 4,589,052.

As described within the aforementioned U.S. patent application 41PR 7458, the resistance of the GMR's change in direct proportion with the magnetic field generated by the closely-positioned phase conductors so that the electrical signals outputted from the GMR's give an accurate value of circuit current in real time.

What is claimed is:

1. A current sensor for multiphase protection comprising:
   a GMR semiconductor element positioned on and in magnetic proximity to a load strap, said load strap being arranged for carrying circuit current within one phase of an electrical system; and
   a conditioner circuit connecting with said GMR semiconductor for receiving signal output from said GMR semiconductor representative of said circuit current and providing signal input to a microprocessor.

2. The current sensor of claim 1 wherein said conditioner circuit includes an operational amplifier having a pair of inputs and an output, said input signal from said GMR semiconductor being applied to one of said inputs.

3. The current sensor of claim 2 including a feedback resistor connecting between one of said inputs and said output.

4. The current sensor of claim 2 further including a burden resistor connecting with said output for generating a voltage signal representative of said circuit current.

5. A circuit interrupter comprising in combination:
   a plurality of separable contacts arranged for connection within a multipole electric circuit;
   an electronic trip unit including means for separating contacts upon occurrence of an overcurrent condition within said multipole electric circuit; and
   a GMR semiconductor element connecting with said electronic trip unit and positioned on and in magnetic proximity to a load strap arranged for carrying circuit current within one phase of said multipole electric circuit;
   whereby said GMR semiconductor element provides a current signal to said trip unit representitive of said circuit current.

6. The circuit interrupter of claim 5 including an operational amplifier connecting between said GMR semiconductor element and said trip unit, said operational amplifier having a pair of inputs and an output, said input current signal from said GMR semiconductor being applied to one of said inputs and said output being connected with said trip unit.

7. The circuit interrupter of claim 6 including a feedback resistor connecting between one of said inputs and said output.

8. The circuit interrupter of claim 7 further including a burden resistor connecting with said output for generating a voltage signal representative of said circuit current.

* * * * *